US011310806B1

(12) United States Patent
Bashir (10) Patent No.: US 11,310,806 B1
(45) Date of Patent: Apr. 19, 2022

(54) DRIVE TEST ANALYSIS (71) Applicant: T-Mobile USA, Inc., Bellevue, WA (US)

(72) Inventor: Shahzad Bashir, Snoqualmie, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 17/108,203

(22) Filed: Dec. 1, 2020

(51) Int. Cl.
*H04W 72/08* (2009.01)
*H04W 16/14* (2009.01)
*G06N 3/08* (2006.01)
*H04W 88/06* (2009.01)
*H04W 24/08* (2009.01)

(52) U.S. Cl.
CPC ............ *H04W 72/082* (2013.01); *G06N 3/08* (2013.01); *H04W 16/14* (2013.01); *H04W 24/08* (2013.01); *H04W 88/06* (2013.01)

(58) Field of Classification Search
CPC ........................ H04W 52/223; H04W 75/0858
USPC ........................................ 370/252; 375/400.4
See application file for complete search history.

(56) References Cited

U.S. PATENT DOCUMENTS

| 6,336,035 B1 | 1/2002 | Somoza et al. | |
|---|---|---|---|
| 7,039,017 B2 | 5/2006 | Sherlock | |
| 7,254,191 B2 | 8/2007 | Sugar et al. | |
| 8,023,599 B2 * | 9/2011 | Tanaka .................. | H04B 17/336 375/347 |
| 8,032,330 B2 * | 10/2011 | Makela ................. | G01R 31/002 702/185 |
| 8,836,262 B2 * | 9/2014 | Wagener ............. | H03M 1/1038 318/400.4 |
| 8,902,778 B2 * | 12/2014 | Bae .................... | H04W 74/0858 370/252 |
| 8,992,832 B2 * | 3/2015 | Donnerbauer ......... | G01N 21/76 422/52 |
| 9,800,320 B2 | 10/2017 | Jalali et al. | |
| 9,874,625 B2 | 1/2018 | Miller | |
| 9,986,440 B2 | 5/2018 | Guvene | |
| 10,490,043 B2 | 11/2019 | Emmanuel et al. | |

(Continued)

FOREIGN PATENT DOCUMENTS

| WO | WO-2019032581 A1 * | 2/2019 | .......... H04W 52/223 |
|---|---|---|---|
| WO | WO2019211792 | 2/2019 | |
| WO | WO-2019216807 A1 * | 11/2019 | ............ H04W 76/27 |

OTHER PUBLICATIONS

M. A. Nair and K. N. Voudouris, "Hybrid sensor and information fusion to enhance signal classification of a multi receiving system," 2018 Advances in Science and Engineering Technology International Conferences (ASET), Jun. 2018, pp. 1-6, doi: 10.1109/ICASET.2018.8376849. (Year: 2018).*

*Primary Examiner* — William D Cumming
(74) *Attorney, Agent, or Firm* — Lane Powell PC (57) ABSTRACT

Systems and methods for detecting, identifying, and locating a source of radio frequency (RF) interference are discussed herein. An interference signal can prevent a user equipment (e.g., mobile phone, smartphone, or the like) from receiving a network signal altogether, can cause a temporary loss of the network signal, can affect the quality of the network signal received, or the like. The system allows for an interference source emitting the interference signal to be detected, identified, and located so that the signal can be powered off to clear a frequency band, thereby improving network service.

20 Claims, 7 Drawing Sheets

(56) References Cited

U.S. PATENT DOCUMENTS 10,570,656 B2 *  2/2020  Elie .......................... G01V 3/10
2017/0013476 A1   1/2017  Suthar et al.

* cited by examiner

DRIVE TEST ANALYSIS

BACKGROUND

Radio frequency (RF) interference is becoming more common in wireless networks as objects, devices, or systems external to the wireless networks that cause interference become more ubiquitous. Some of these objects, devices, or external systems that cause interference do so by emitting interference signals or blocking radio signals that disrupt the transmissions within the wireless networks. The interference can prevent a user equipment (e.g., mobile phone, personal digital assistant, smartphone, tablet, or any device capable of emitting or receiving a wireless signal) from receiving a network signal altogether, can cause a temporary loss of the network signal, can affect the quality of the network signal received, or can cause other network disruptions.

For example, recently deployed Long-Term Evolution (LTE) radio networks experience an increase in RF interference from television (TV) stations and other external RF sources. In order to detect, identify, and locate an RF interference source, telecommunications networks regularly perform drive testing. Drive testing is a process by which RF power data is collected over a given frequency range with a spectrum analyzer. The drive testing is performed at various physical locations around the area experiencing interference.

In some cases, the RF interference source is identifiable based on its signal signature in response to a drive test, such as a TV station broadcast signal that produces a distinct signal shape and amplitude in response to a drive test. In other cases, the signal may be distorted because of multipath interference (i.e., antenna receives the signal by two or more paths), obstructions in a signal propagation path (i.e., a path from a transmitter to a receiver), or other reasons. As signal distortion increases, the sources of these signals become more difficult to identify.

A typical drive test data collection effort can produce hundreds or thousands of data sets leading to significant investment in human resources to identify and resolve the interference sources. This can make signal processing and analysis time consuming and costly. The human investment can also lead to a greater error rate, such that an interference source is improperly identified or dismissed. A visual inspection may not be able to properly interpret, classify, or detect one or more aspects of the collected data or signal. Therefore, a permissible signal may be turned off, while an impermissible signal is kept on. Additionally, the signal analysis, signal processing, or both cannot be done in the field due to the high number of data sets.

The state of the art would benefit from an improved and more efficient system for identifying and resolving interference sources within a telecommunications network.

DETAILED DESCRIPTION

Systems and methods for detecting, identifying, and locating a source of radio frequency (RF) interference are discussed herein. A service provider, such as a telecommunications provider, can own an exclusive license to a specific band of a frequency spectrum over which their wireless services are offered. In order to maintain high fidelity service of the specific band, the service provider can clear the specific band of unauthorized interference sources. An unauthorized interference source is an external source that cause RF interference with a telecommunication network signal. To clear the specific band, the service provider detects, identifies, and locates the interference source and then powers off the interference signal emitted by the interference source. The disclosed systems and methods allow detection, identification, and location of the interference source so that the interference signal can be required to stop transmission within the specific frequency band or powered off to allow for telecommunications signals to be transmitted within the specific frequency band with only known interference sources for which network operations can be adjusted to accommodate or in an unobstructed manner.

For example, a telecommunications provider owns band 71, which is a frequency band at 600 megahertz (MHz). This frequency band is used for Long-Term Evolution (LTE or 4G) and New Radio (NR or 5G). However, this frequency band was previously used for channels 38-51 of ultra-high frequency radio for over-the-air transmission of television signals, or UHF TV. The TV channels that were previously using the frequency band are relocated to different frequencies. Any existing interference sources emitting the interference signals (e.g., radio frequency, or RF) in the frequency band are powered down to avoid interference. In the event these interference signals have not been powered down, the telecommunications provider can detect, identify, and locate the source of the interference signals to then power them down to eliminate the interference.

The system can include a detection device. The detection device includes memory, a processor, a location module, a RF power sensor, an algorithm, an artificial intelligence module, a modem, and antennas. The detection device can collect measurement data and analyze the measurement data. The detection device can also identify the interference source, such as by comparing the analyzed data against signatures of known interference sources, by calculating a probability that an interference signal is from an unknown source, the like, or combinations or multiples thereof.

The system can also include an external interference source database. The external interference source database includes memory, a processor, a modem, and an antenna. The external interference source database can be used to store a list of known interference sources. The external interference source database can also transmit the list of known interference sources or a portion of the list to the detection device.

In one example, the detection device, individually, can be used to detect, identify, and locate the interference source. The memory of the detection device can include a list of known interference sources within an area of interest. In another example, the detection device and the external interference source database, collectively, can be used to detect, identify, and locate the interference source. The detection device can communicate with the external interference source database to obtain the list of known interference sources within the area of interest.

Figure 1:
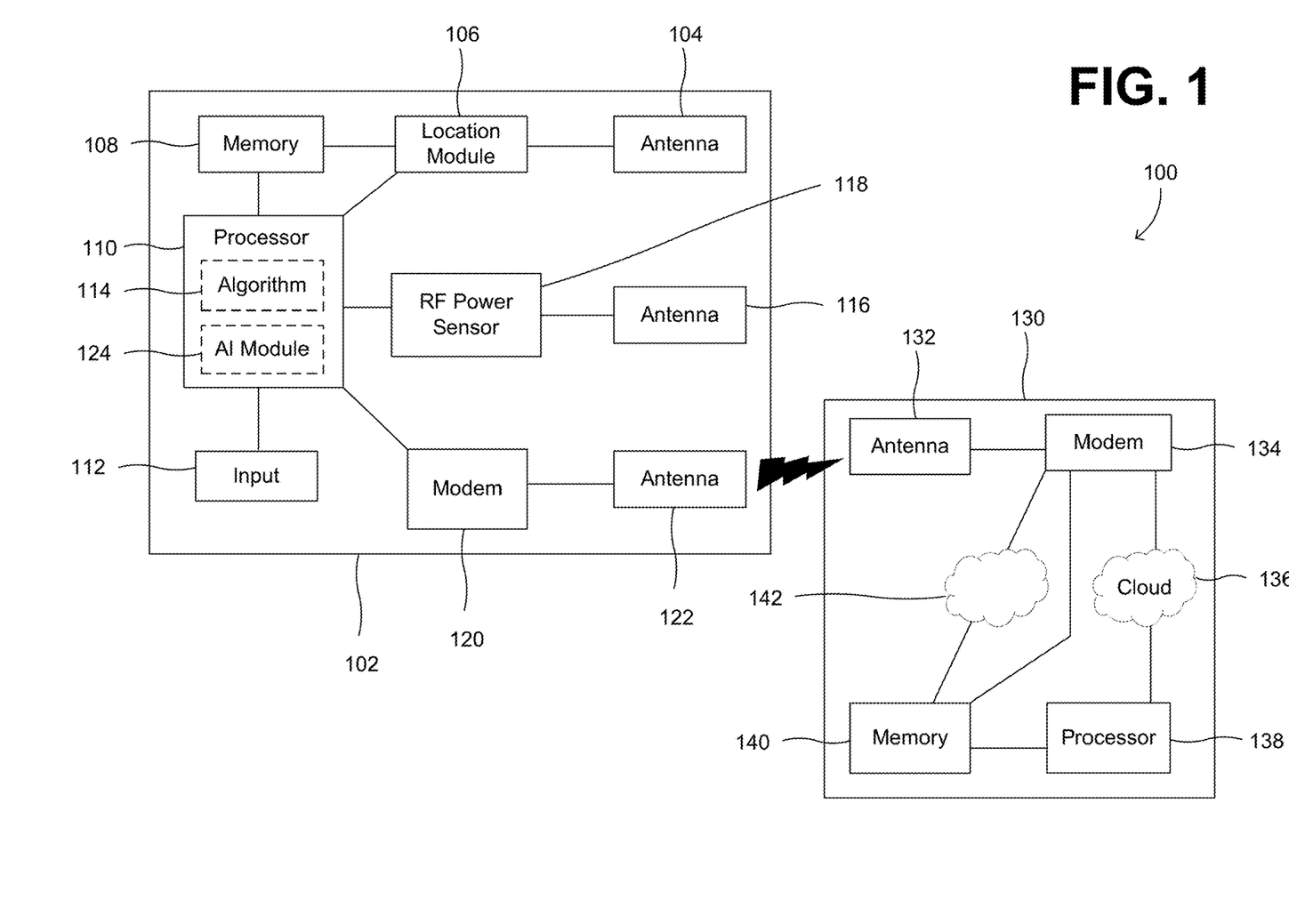
FIG. 1 illustrates an example analysis system.

FIG. 1 shows a system 100 to detect, identify, and locate an interference source (i.e., a source that emits an interference signal). The system 100 includes a detection device 102. The system 100 can also include an external interference source database 130.

The detection device 102 can collect measurement data associated with an interference signal, including measurements of power over a set of frequencies (collectively, RF power measurements) and a location at which the RF power measurements are collected. The detection device can process and analyze the measurement data of the interference signal. The detection device 102 can also identify the interference source, such as by comparing the processed and analyzed data against signatures and specifications of known interference sources or interference signals, by calculating a probability that the interference signal is from an unknown source, the like, or combinations or multiples thereof.

The detection device 102 includes memory 108, a processor 110, a location module 106, a RF power sensor 118, an algorithm 114, an artificial intelligence (AI) module 124, and a modem 120. The detection device 102 can also include antennas 104, 116, 122 to receive, transmit, or both electromagnetic waves, such as radio waves.

The detection device 102 can also include an input 112, such as a keyboard, a touch screen, or any object or device to input information into the detection device 102. The input 112 can be used to permit an operator to input a frequency, a set of frequencies, or a frequency band across which RF power measurement data is to be collected. In one example, the input 112 is a physical component of the detection device. In another example, the input 112 is external to the detection device 102 and can be in communication with the detection device 102 via a wired connection (e.g., USB) or a wireless connection (e.g., Bluetooth®, infrared, WiFi, or the like).

The memory 108 stores information associated with the detection device 102 (e.g., location, measured radio frequency power data, operator input, known interference source data, algorithm information, the like, or combinations or multiples thereof). The memory 108 can be primary memory (e.g., RAM, ROM, or the like) or secondary memory (e.g., hard drive, CD, thumb drive, or the like).

The processor 110, such as a CPU, controls and coordinates the operations of the other components of the detection device 102.

The location module 106 measures the location of the detection device 102, such as the location on the surface of earth with assigned coordinates based on the measure location. The location module 106 can be a global positioning system (GPS), Wi-Fi, a global navigation satellite system (GNSS), a hybrid positioning system, the like, or combinations or multiples thereof. A location antenna 104, in communication with the location module 106, receives location signals from external locators, such as satellites, cell towers, the like, or combinations or multiples thereof. The location signals are then transmitted from the location antenna 104 to the location module 106. The location module 106 then processes the received signals to determine the location of the detection device 102.

The RF power sensor 118 measures the power over a set of frequencies as defined by the operator via the input 112 and stored in the memory 108. To determine the RF power data, an RF interference source antenna 116, in communication with the RF power sensor 118, receives interference signals from interference sources. The RF power sensor 118 then performs signal processing on the received signals to determine amplitudes (e.g., decibel milliwatt, or dBm) of a signal at individual frequencies within the set of the frequencies. These data points form a waveform to provide a visual depiction of the interference signal. The data points can be transmitted to the AI module 124 for interference identification or to the memory 108 for subsequent use or analysis.

The AI module 124 can analyze the interference signal, such as with signal processing, and compare the interference signal against known interference signals, unknown interference signals, or both to identify the source of the interference with a level of confidence. The level of confidence represents how similar the interference signal is to a known interference signal, an unknown interference signal, or both with a given area. The AI module 124 can include machine learning, such as supervised learning, unsupervised learning, reinforcement learning, an artificial neural network, the like, or combinations or multiples thereof. This information is stored back in memory 108 in correlation with the location. The AI module 124 can process the interference signal to smooth any distortion, to identify a known interference source based on acceptance of distortion within a given percentage of the signature and specification of the known interference source, the like or combinations or multiples thereof. In one example, the AI module 124 can be stored within logic of the processor 110. In another example, the AI module 124 can be external to and in communication with the processor 110 for initiation or engagement purposes.

The modem 120, which converts data into a digital format appropriate for a transmission medium (e.g., radio, satellite, Bluetooth®, WiFi, infrared, LTE, 5G NR, WiMax, GPS, Near-Field Communication, or the like), allows for communication of the processor 110 with the external interference source database 130. A device antenna 122 can communicate with a database antenna 132 via a wired or wireless connection (e.g., Bluetooth®, WiFi, infrared, LTE, 5G NR, or the like). The device antenna 122 and the database antenna 132 can be transceivers, which can transmit and receive signals.

The external interference source database 130 includes the antenna 132 in communication with a modem 134. The modem 134 can receive interference source information (e.g., known interference source signatures and specifications) from a cloud storage 136, directly from the memory 140, or from the memory 140 via an internet 142 or wireless connection (e.g., Bluetooth®, WiFi, infrared, LTE, 5G NR, or the like). A processor 138 controls and coordinates the operations of the other components of the external interference source database 130.

The algorithm 114 is a sequence of computer-implementable instructions to solve a problem or perform a computation. The algorithm 114 can be stored on the processor 110, stored in the memory 114, stored on a logic unit in communication with the processor 110, the like, or combinations or multiples thereof.

Figure 2:
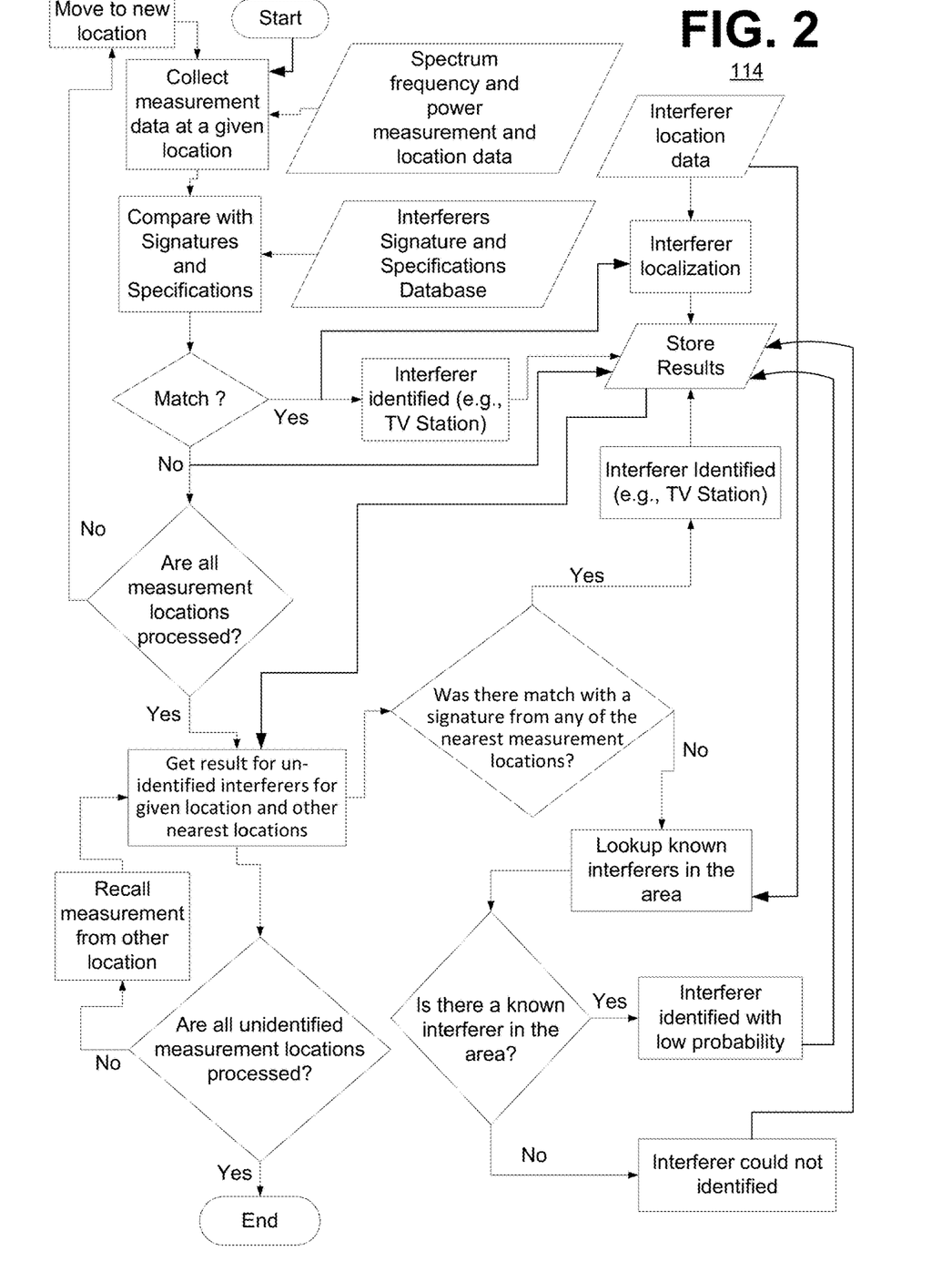
FIG. 2 illustrates a flowchart for an example algorithm.
Figure 3:
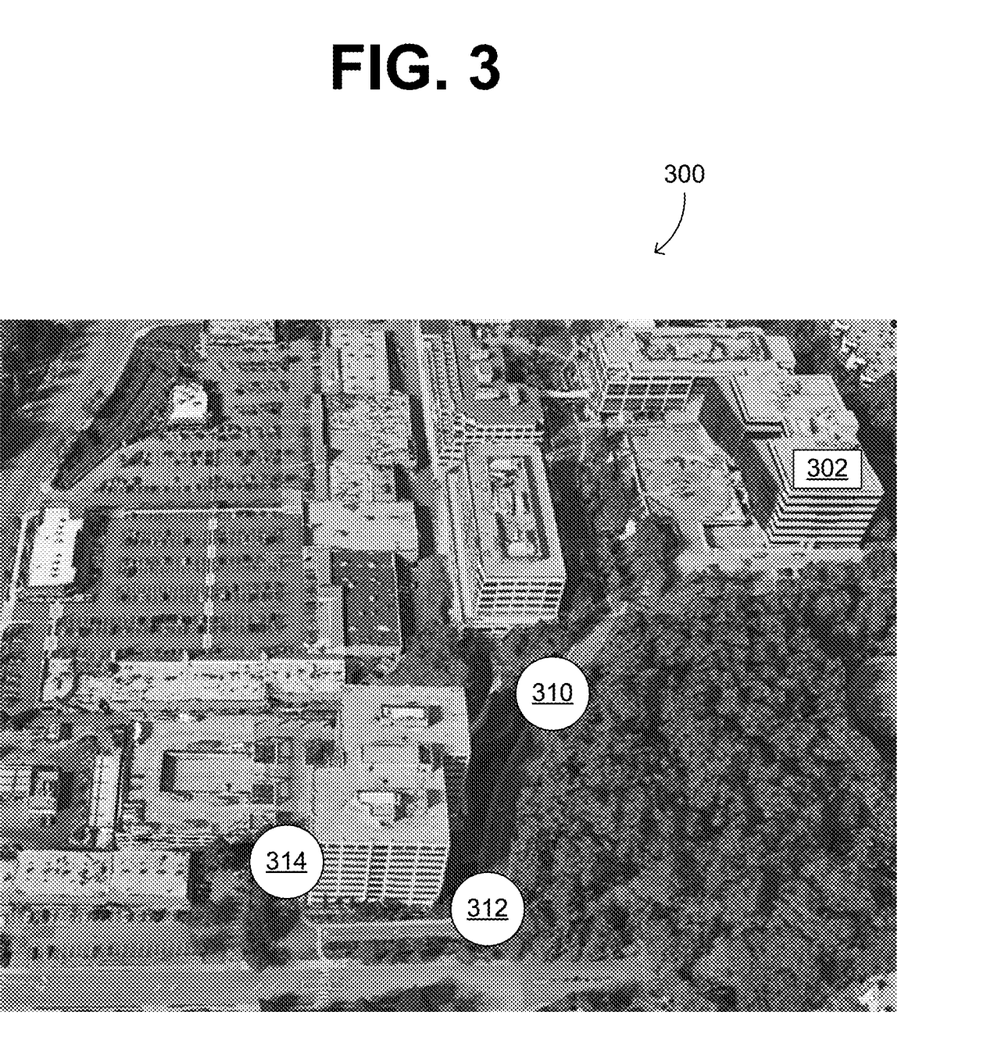
FIG. 3 illustrates an example map with an example interference source and example test locations.

FIG. 2 shows a flowchart of the algorithm 114. FIG. 3 shows a map 300 of an area in which a drive test is performed. The algorithm 114, for ease of discussion, shall be discussed in reference to the map 300. The map 300 represents a given area having an interference source 302, a first test location 310, a second test location 312, and a third test location 314. However, the algorithm 114 can be used in any area and is not limited to the area depicted by the map 300. For example, another area can include no interference sources or multiple interference sources. As another example, another area can include one test location, two test locations, three test locations, or more test locations.

Measurement data is initially collected at the first test location 310. The measurement data includes location data of the first test location 310 and RF power data of an interference signal collected at the first test location 310. At the first test location 310, the processor 110 instructs the RF power sensor 118 to measure the power over the set of frequencies defined by an operator via the input 112 or having been pre-set and stored within the memory 108. The RF power sensor 118 performs the measurement and returns the data to the processor 110 which is then stored in the memory 108.

The processor 110 also instructs the location module 106 to measure the location of the detection device 102. The location module 106 performs the measurement and returns the data to the processor 110, which is then sent to the memory 108 for storage in correlation with the RF power measurement. To determine where the first location 310 is located (e.g., coordinates, including latitude and longitude), the location antenna 104 receives signals from external locators, such as satellites, cell towers, the like, or combinations or multiples thereof. The signals are then transmitted from the location antenna 104 to the location module 106. The location module 106 then processes the received signals to determine the location data associated with the first test location 310. The location measurement can be performed before, after, concurrently with, or simultaneously with the RF power measurement.

After collecting the measurement data, the measurement data is compared with known interference source signatures and specifications, such as by the processor 110, including the AI module 124. In one example, the known interference source signatures and specifications within the given area can be retrieved from the memory 108. The known interference source signatures and specifications can be stored on or pre-loaded onto the memory 108, such as by downloading from the external interference source database 130, by being input by an operator, or both. In another example, the known interference source signatures and specifications within the given area can be retrieved on-demand from the external interference source database 130 (i.e., instantaneously when requested by an operator via the detection device 102).

A confidence level can be attributed to the interference source signal based on characteristics of the interference source signal relative to the standard waveform. The characteristics of the interference source signal, which are electrical characteristics or parameters, are compared to the standard waveform and, if the confidence level is within a given or acceptable tolerance, are determined to be a match, a partial match, or no match with the known interference source signature and specification. The characteristics for analysis or comparison can include shape, power across frequencies, distortion or variability relative to the standard waveform, the like, or combinations of multiples thereof. In one example, a confidence level of 80% or greater can be determined to be a match. In another example, a confidence level of 50-79% can be determined to be a partial match. In yet another example, a confidence level less than 50% (e.g., 0-49%) can be determined to not be a match.

The confidence level can be used to determine whether the interference source signal is the match, the partial match, or no match with the known interference source signature and specification, such as based on a comparison or analysis by the processor 110, including the AI module 124. The confidence level can be provided as an absolute value (e.g., an integer), a percentage, a classifier (e.g., "high confidence," " "low confidence," or the like), a scaled value (e.g., "92/100" or "92 out of 100"), the like, or combinations or multiples thereof.

When there is a match between the interference signal collected by the detection device 102 and the signal of a known interference source, the known interference source is identified and the results are stored, such as in a database, in the memory 108, the like, or combinations, or multiples thereof. A match occurs when the interference source signal shares a given number of common characteristics with a standard waveform. The number of common characteristics can be associated with a confidence level, such that a greater number of the common characteristics is associated with a higher confidence level. The confidence level or required number of common characteristics for the match can be determined based on operator input or pre-determined ranges or values. In one example, a confidence level of 80% or greater can be determined to be a match. In another example, a confidence level of 50-79% can be determined to be a match. In yet another example, a confidence level less than 50% and greater than 0% can be determined to be a match, where it is desirous or necessary to do so.

The stored results can include the identification of the interference source (e.g., TV station), the location of the interference source (i.e., based on the known interference source location and the location data of the detection device 102), any revisions or updates to the interference source signal, the like, or combinations or multiples thereof.

When a partial match is found, the identity of the interference source is noted with uncertainty. A partial match occurs when the interference source signal shares a given number of common characteristics with a standard waveform. The number of common characteristics can be associated with a confidence level, such that a greater number of the common characteristics is associated with a higher confidence level. The confidence level or required number of common characteristics for the partial match can be determined based on operator input or pre-determined ranges or values. In one example, a confidence level of greater than 80% and less than 100% can be determined to be a partial match. In another example, a confidence level less than 80% and greater than 0% can be determined to be a partial match, where it is desirous or necessary to do so.

In one example, the processor 110 then instructs the modem 120 to create a link to the modem 134 via the antenna 122 and the antenna 132 in order to access data stored in the memory 140. The memory 140 contains data about other known interference sources within the geographic area of interest or within geographic areas slightly beyond the original geographic area. The known interference sources are stored to memory 108. The processor 110 then looks up the identity of the interference source in the stored data. If a match is found, the interference source is identified as having a given confidence level.

In another example, the processor 110 recalls (i.e., retrieves or requests) measurement data of other locations from the memory 108 of the detection device 102 or from the memory 140 of the external interference source database 130. The processor 110 then looks up the identity of the interference source in the recalled data. If a match is found, the interference source is identified with certainty.

When there is no match between the interference signal collected by the detection device 102 and the signal of a known interference source, the results are stored and the algorithm 114 proceeds to determine if all test locations are processed. When fewer than all test locations have been processed, the operator moves to an unprocessed test location, such as the second test location 312. The data and measurements are then collected and analyzed. The process continues until all test locations have been processed. Interference signals collected at each of the locations can then be compared against the known interference sources to determine whether there are any matches with the interference signal.

When there is no complete or no partial match between the interference signal and known interference sources, measurement data (i.e., location data and RF power measurement) from any remaining locations, such as the second test location 312 and the third test location 314, is collected and analyzed. This information is stored back in memory 108 in correlation with the location.

The measurement data of each location is sent to the AI module 124. The AI module 124 identifies the possible interference sources with some confidence level using signal processing.

For example, the AI module 124 compares the measurement data (e.g., amplitude or magnitude of the power of the interference signal over a range of target frequencies) of each location to the known interference sources relative to each location. The measurement data from the first test location 310 where the interference source was identified with less certainty is retrieved again and is compared with measurement data collected from the other locations. When one or more of the second and third locations 312, 314 that identified the interference source with high certainty (such as compared to a known interference source in the area), the data from the second test location 312, the third test location 314, or both is provided to the AI module 124 for training and the certainty of the identified interference source at the first location 310 is increased, such as for future analyses.

The AI module 124 can be trained using training data. Training data is a collection of labeled information used to build a machine learning model. The data can be annotated. The AI module 124 can learn to perform its task at a high level of accuracy based on the training data. The training data can be used multiple times to help the AI module 124 refine the predictions and improve the success rate. The AI module 124 can also learn with the inclusion of validation data. Validation data is data input into the AI module 124 after training the AI module 124 with the training data to determine whether or not the AI module 124 can correctly identify new data or if the training data is being underfit (i.e., underlying data trend is not captured) or overfit (i.e., noise of the training data is being captured). Validation allows for the adjustment of parameters and improvement of the AI module 124 accuracy. The AI module 124 can also use testing data after both training and validation to test the accuracy of the AI module 124. The testing data can also provide further confirmation that the AI module 124 is not overfitting or underfitting the various data.

When there is no known interference source in the area, then the interference source cannot be identified and the results are stored. The results are stored for later analysis, such as by an operator, or to include in a database for future identification. The results can be used to identify the unknown interference source when the unknown interference source is later positively identified or identified by comparing or combining signal data from other locations proximal to the unknown interference source.

After the interference source has been identified, the interference signal emitted by the interference source can be powered off or its transmissions can be terminated. In one example, external power supplied to the interference source can be powered off. In another example, a device or system of the interference source emitting the interference signal can be individually powered off.

Figure 4:
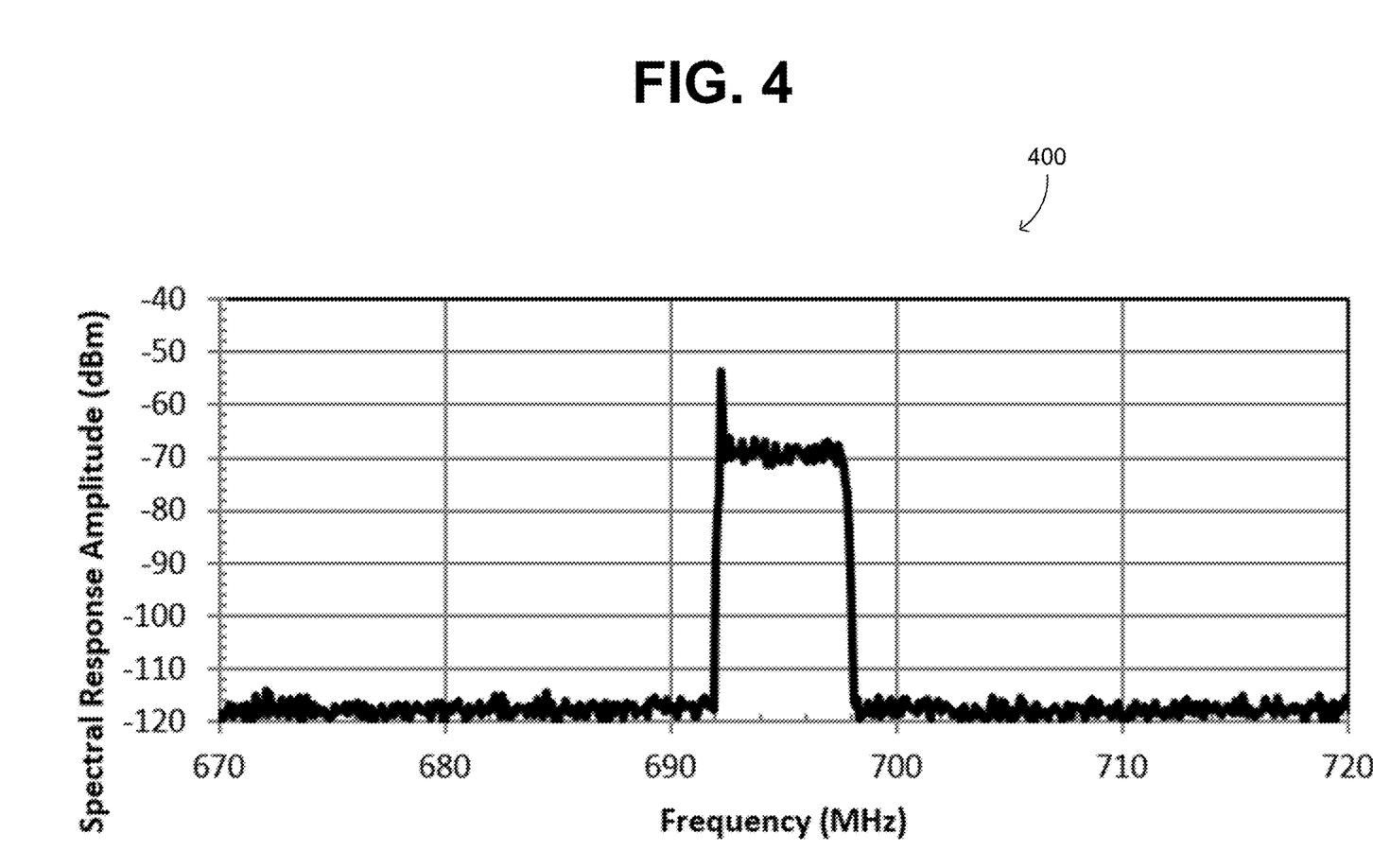
FIG. 4 illustrates an example standard waveform collected during a drive test.

FIG. 4 shows a signal having a standard waveform 400 of an interference source from ideal TV transmission condition, such as within a laboratory setting.

Figure 5:
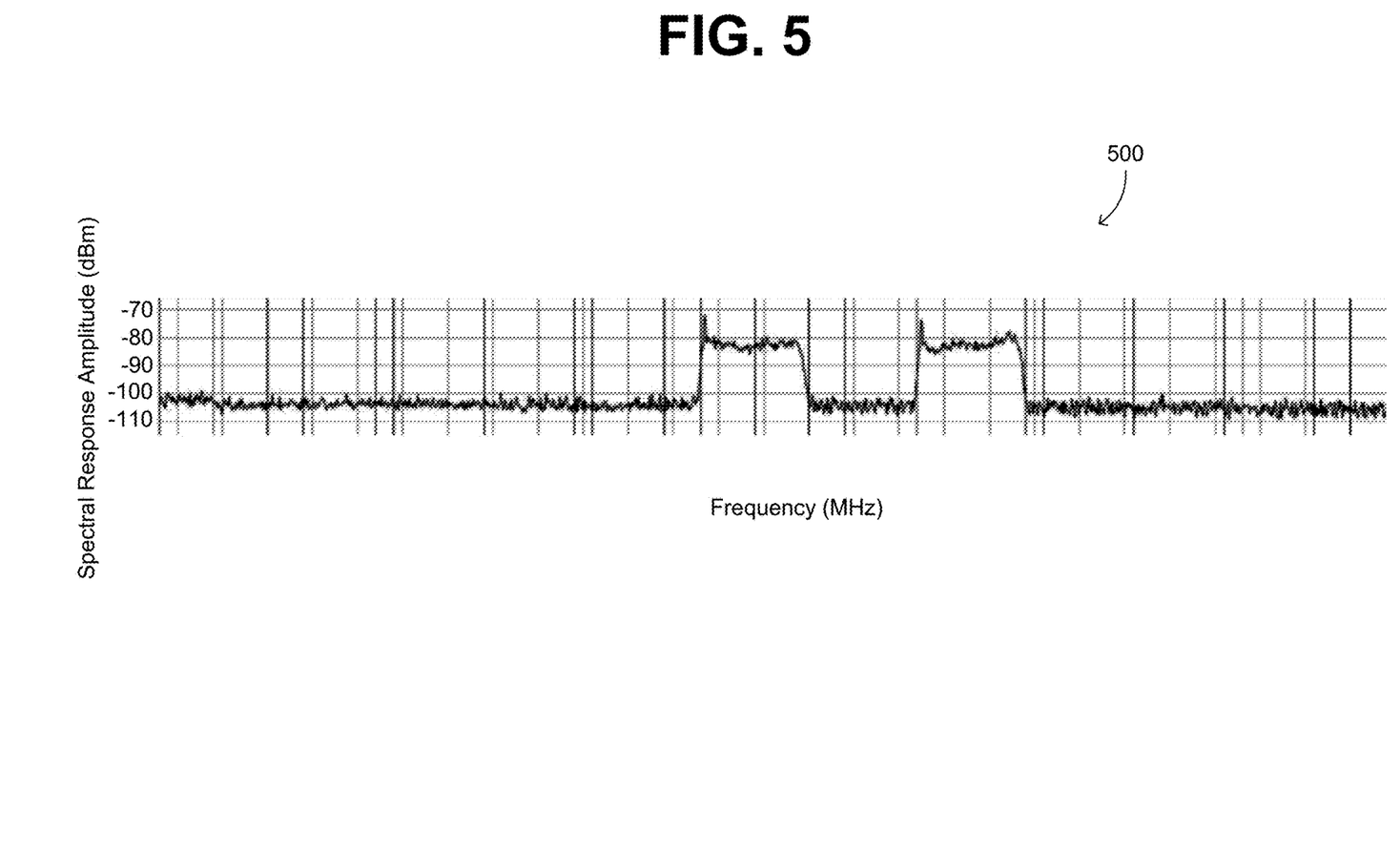
FIG. 5 illustrates another example waveform collected during a drive test.

FIG. 5 shows a signal having a waveform 500 collected from a first location during a drive test. The waveform 500 can be compared to the standard waveform 400, such as by the AI module 124, to determine the identity of the interference source that is emitting the signal having the waveform 500 proximal to the first location. The signal having the waveform 500 has no distortion or an ultra-low level of distortion (e.g., up to 10% deviation from the signal having the standard waveform 400).

Figure 6:
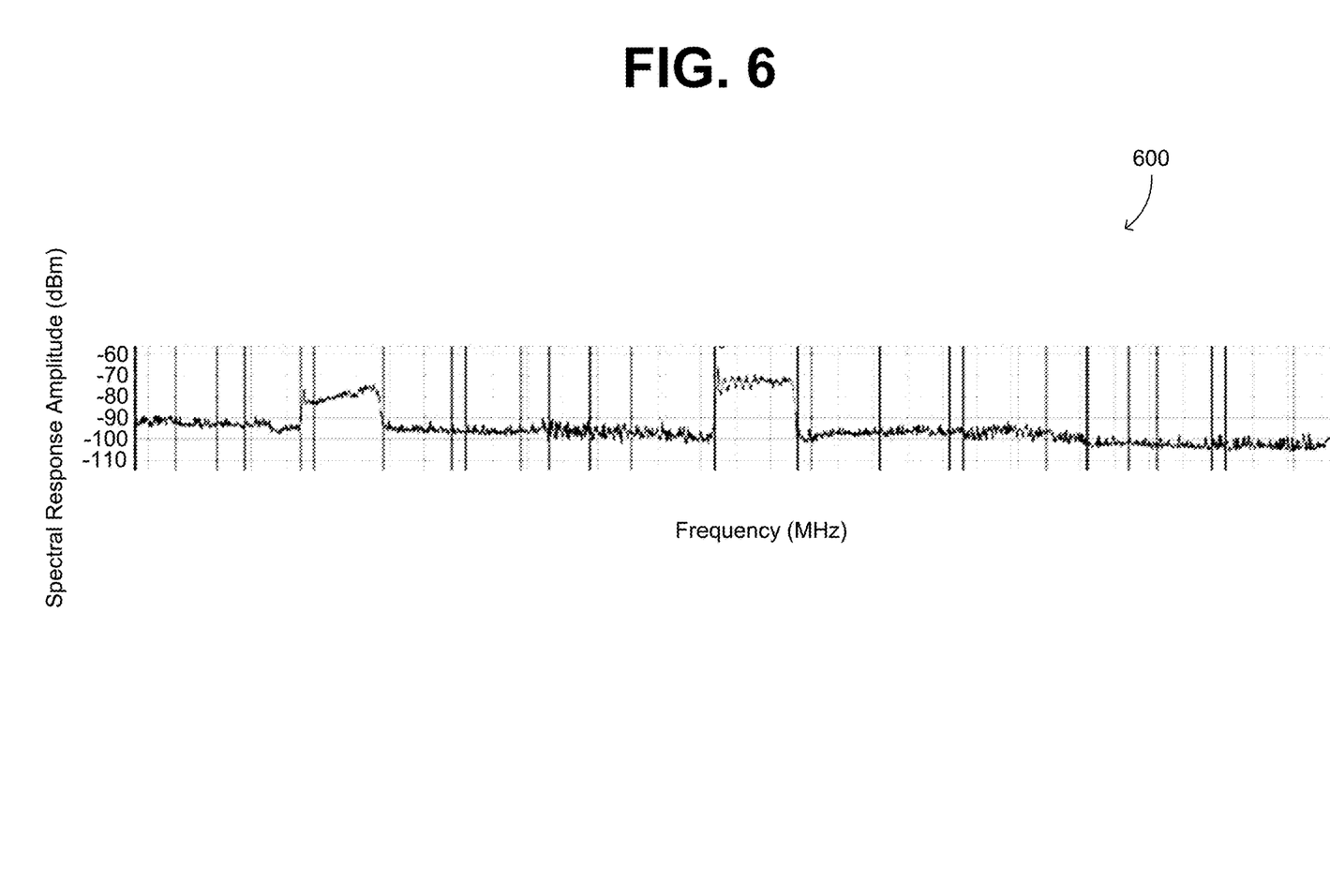
FIG. 6 illustrates an example collected waveform with a low level of distortion.

FIG. 6 shows a signal having a waveform 600 collected from a second location during the drive test. The waveform 600 can be compared to the standard waveform 400, such as by the AI module 124, to determine the identity of the interference source that is emitting the signal having the waveform 600 proximal to the second location. The signal having the waveform 600 has a low level of distortion (e.g., 10-40% deviation from the signal having the standard waveform 400).

Figure 7:
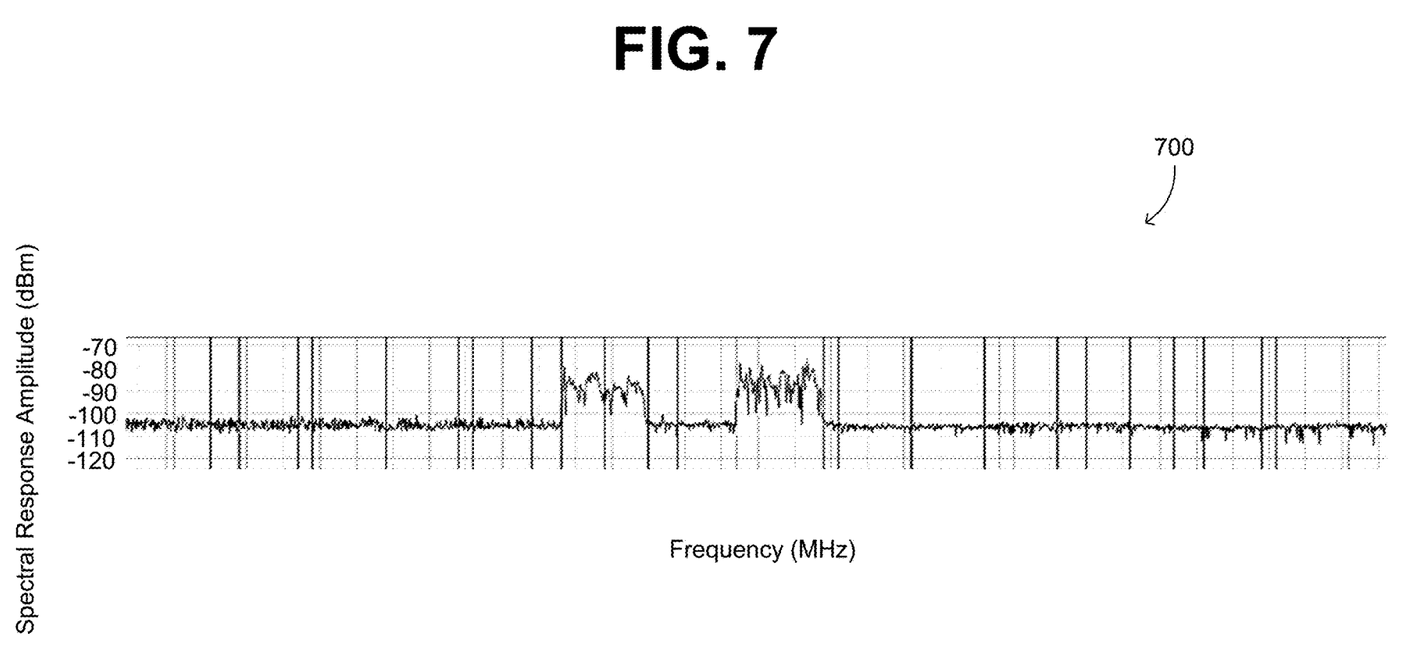
FIG. 7 illustrates an example collected waveform with a high level of distortion.

FIG. 7 shows a signal having a waveform 700 collected from a third location during the drive test. The waveform 700 can be compared to the standard waveform 400, such as by the AI module 124, to determine the identity of the interference source that is emitting the signal having the waveform 700 proximal to the third location. The signal having the waveform 700 has a medium or high level of distortion (e.g., greater than 40% deviation from the signal having the standard waveform 400).

Though the waveforms 500, 600, 700 are discussed as being collected from specific locations, the waveforms 500, 600, 700 can be collected from any of the locations. When one of the waveforms 500, 600, 700 is not sufficient to identify or locate the interference source emitting the signal having that waveform, two or more of the waveforms 500, 600, 700 can be collectively analyzed to identify and locate the interference source emitting the interference signal.

Though an operator is discussed as moving from test location to test location with the detection device, the operator may cause the detection device to move from location to location, such as by flying (e.g., a drone), driving (e.g., a RC car), or the like. Furthermore, the vehicle (e.g., drone or RC car) can be programmed to move from location to location based on interference signal analysis and results.

Embodiments of the invention can include a non-transitory computer readable medium which can store instructions for performing the above-described methods and any steps thereof, including any combinations of the same. For example, the non-transitory computer readable medium can store instructions for execution by one or more processors or similar devices.

Further embodiments of the present invention can also include the one or more user equipment(s), network sites, backend network, or servers which read out and execute computer executable instructions, such as a non-transitory computer-readable medium, recorded or stored on a storage medium (which may be the same as or different than the storage medium for storing images or files, as discussed above), to perform the functions of any embodiment. The user equipment or server may include one or more of a central processing unit (CPU), micro processing unit (MPU), or other circuitry, such as a processor, and may include a network of separate user equipment or servers or separate computer processors. The computer executable instructions may be provided to the user equipment, network node, or server, for example, from a network or the storage medium.

Though certain elements, aspects, components or the like are described in relation to one embodiment or example of a detection system, those elements, aspects, components or the like can be including with any other detection system, such as when it desirous or advantageous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A system for identifying a source of an interference signal, the system comprising:
    a detection device including:
        a location module configured to determine a geographic location of the detection device when receiving the interference signal;
        a radio frequency (RF) power sensor configured to detect power amplitudes over a range of frequencies of the interference signal; and
        a processor configured to:
            compare characteristics of the interference signal to characteristics of a known signal,
            calculate a confidence level of a source of the interference signal, the confidence level indicating that the interference signal matches an identity of the known signal based on the comparison of the characteristics of the interference signal to the characteristics of the known signal,
            identify the source of the interference signal based on the confidence level, and
            output the source of the interference signal.

2. The system of claim 1, wherein the characteristics of the interference signal include the geographic location, a signal signature, or both.

3. The system of claim 2, wherein the characteristics of the known signal include a known geographic location, a known signal signature, or both.

4. The system of claim 1, further comprising a memory configured to store information associated with the known signal.

5. The system of claim 4, wherein the information includes a source of the known signal, a geographic location of the source, a signal signature of the known signal, or combinations thereof.

6. The system of claim 1, wherein the confidence level further indicates that the interference signal is a partial match or no match with the identity of the known signal based on the comparison of the characteristics of the interference signal to the characteristics of the known signal.

7. The system of claim 1, wherein the detection device further comprises an input to select or receive an instruction with the set of frequencies across which the interference signal is collected and analyzed.

8. The system of claim 1, further comprising an artificial intelligence (AI) module configured to identify the source of the interference signal based on the confidence level.

9. The system of claim 8, wherein the AI module includes supervised learning, unsupervised learning, reinforcement learning, an artificial neural network, or combinations or multiples thereof.

10. The system of claim 1, further comprising an external interference database including information associated with the known signal.

11. The system of claim 10, wherein the detection device communicates with the external interference database via a wireless communication protocol.

12. The system of claim 11, wherein the processor is further configured to recall the characteristics of the known signal from the external interference database to compare against the characteristics of the interference signal.

13. The system of claim 1, wherein the processor is further configured to compare the characteristics of the interference signal to characteristics of known signals from different geographic locations proximal to a geographic location at which the interference signal is collected when an initial confidence level is associated with a partial match or no match.

14. The system of claim 1, wherein the processor compares the characteristics of the interference signal to characteristics of known signals from different geographic locations proximal to the geographic location at which the interference signal is collected when an initial confidence level is associated with a partial match or no match.

15. A method for identifying a source of an interference signal, the method comprising:
    receiving the interference signal;
    determining a geographic location of the detection device at which the interference signal is received;
    determining a signal signature based on power amplitudes of the received interference signal received over a set of frequencies;
    comparing characteristics of the interference signal to characteristics of a known signal;
    calculating a confidence level of a source of the interference signal, the confidence level indicating that the interference signal source matches a source of the known signal based on the comparison of the characteristics;
    identifying the source of the interference signal based on the confidence level; and
    outputting the source of the interference signal.

16. The method of claim 15, wherein the characteristics of the interference signal include the geographic location, the signal signature, or both.

17. The method of claim 15, wherein the characteristics of the known signal include a known geographic location, a known signal signature, or both.

18. The method of claim 15, further comprising retrieving the characteristics of the known signal from a memory of a detection device or an external interference database to compare against the characteristics of the interference signal.

19. The method of claim 15, further comprising training an artificial intelligence module to identify the source of the interference signal based on a comparison of the characteristics of the interference signal to the characteristics of a known signal.

20. The method of claim 15, further comprising comparing the characteristics of the interference signal to characteristics of known signals from different geographic locations proximal to the geographic location at which the interference signal is collected when an initial confidence level is associated with a partial match or no match.

* * * * *